(12) United States Patent
Wilkinson

(10) Patent No.: US 9,939,327 B2
(45) Date of Patent: Apr. 10, 2018

(54) METHOD AND APPARATUS TO DYNAMICALLY CONTROL HOW OFTEN TEMPERATURE READINGS ARE RECEIVED

(71) Applicant: Wal-Mart Stores, Inc., Bentonville, AR (US)

(72) Inventor: Bruce W. Wilkinson, Rogers, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 15/183,265

(22) Filed: Jun. 15, 2016

(65) Prior Publication Data

US 2016/0381438 A1      Dec. 29, 2016

Related U.S. Application Data

(60) Provisional application No. 62/185,474, filed on Jun. 26, 2015.

(51) Int. Cl.
*G08B 17/00* (2006.01)
*G01K 1/02* (2006.01)

(52) U.S. Cl.
CPC ............ *G01K 1/024* (2013.01); *G01K 1/022* (2013.01); *G01K 2215/00* (2013.01)

(58) Field of Classification Search
CPC ........................ F25D 2700/12; F25D 2700/14
USPC ................... 340/584, 585, 586, 12.51, 13.26
See application file for complete search history.

(56) References Cited

U.S. PATENT DOCUMENTS

| | | | |
|---|---|---|---|
| 7,495,558 B2 | 2/2009 | Pope | |
| 8,870,453 B2 * | 10/2014 | Branch | G01K 3/04 340/588 |
| 2004/0008112 A1 | 1/2004 | Carrender | |
| 2009/0201198 A1 | 8/2009 | Moudy | |
| 2009/0216497 A1 * | 8/2009 | Schwiers | H04Q 9/00 702/188 |
| 2011/0029413 A1 | 2/2011 | Ben-Tzur | |

(Continued)

FOREIGN PATENT DOCUMENTS

EP         2835078         2/2015

OTHER PUBLICATIONS

PCT; App. No. PCT/US2016/038898; International Search Report and Written Opinion dated Sep. 6, 2016.

*Primary Examiner* — Kevin Kim
(74) *Attorney, Agent, or Firm* — Fitch, Even, Tabin & Flannery LLP

(57) ABSTRACT

A control circuit dynamically controls how often temperature readings are received from a communication device such as an RFID tag having an integral temperature sensor. The communication device can be disposed to monitor an internal temperature of, for example, a delivery container. By one approach the control circuit dynamically controls how often the temperature readings are received as a function, at least in part, of local conditions for the delivery container. By one approach the aforementioned local conditions pertain to the contents of the delivery container. Examples in these regards include a temperature-based state of the contents, a volume-based metric of the contents, and mass-based metrics of the contents. By another approach, in lieu of the foregoing or in combination therewith, the aforementioned local conditions can pertain to ambient conditions as regards the delivery container.

17 Claims, 3 Drawing Sheets

(56) References Cited

U.S. PATENT DOCUMENTS

| | | | |
|---|---|---|---|
| 2011/0156873 A1* | 6/2011 | Choi | G06K 19/0717 340/10.1 |
| 2011/0193710 A1* | 8/2011 | McIlvain | B60P 3/20 340/585 |
| 2011/0221573 A1 | 9/2011 | Huat | |
| 2013/0285795 A1 | 10/2013 | Virtanen | |
| 2014/0313055 A1 | 10/2014 | Warkentin | |
| 2015/0039267 A1* | 2/2015 | Busch | G07C 5/008 702/182 |

* cited by examiner

METHOD AND APPARATUS TO DYNAMICALLY CONTROL HOW OFTEN TEMPERATURE READINGS ARE RECEIVED

RELATED APPLICATION(S)

This application claims the benefit of U.S. Provisional application No. 62/185,474 filed Jun. 26, 2015, which is incorporated by reference in its entirety herein.

TECHNICAL FIELD

These teachings relate generally to the transmission of temperature readings.

BACKGROUND

Delivery receptacles are known in the art. Delivery receptacles can serve to receive the unattended delivery of one or more items. The use of delivery receptacles, however, gives rise to a variety of corresponding problems. When the items being delivered are frozen or refrigerated, for example, there is a risk that the item will warm or thaw to a point of being unsuitable for its intended purpose before the recipient can recover the item from the delivery receptacle.

Refrigerated delivery receptacles can help to ameliorate such a risk. Unfortunately, refrigeration components can be a relatively expensive option that also gives rise to a variety of usage and maintenance challenges.

Communication devices, such as radio-frequency identification (RFID) tags, that include an integral, on-board temperature sensor are known in the art. Such an RFID tag could be placed inside a delivery receptacle to provide temperature readings of the interior of the delivery receptacle when read by an RFID tag reader. Reading such a tag, however, and possibly then communicating the ascertained temperature information to a remote location, requires energy. There are many application settings where minimizing the expenditure of energy constitutes a significant design requirement. Setting the periodicity of reading and reporting a temperature sensing RFID tag to be relatively infrequent to thereby save energy carries with it the concurrent risk that the temperature inside the delivery receptacle may warm to an unacceptable degree before such a state is detected. Conversely, setting the frequency of reading and reporting a temperature sensing RFID tag to be relatively frequent to avoid such a risk carries with it the necessary requirement of increased (and likely unnecessary) energy usage.

BRIEF DESCRIPTION OF THE DRAWINGS

The above needs are at least partially met through provision of the method and apparatus to dynamically control how often temperature readings are received described in the following detailed description, particularly when studied in conjunction with the drawings, wherein.

Figure 1:
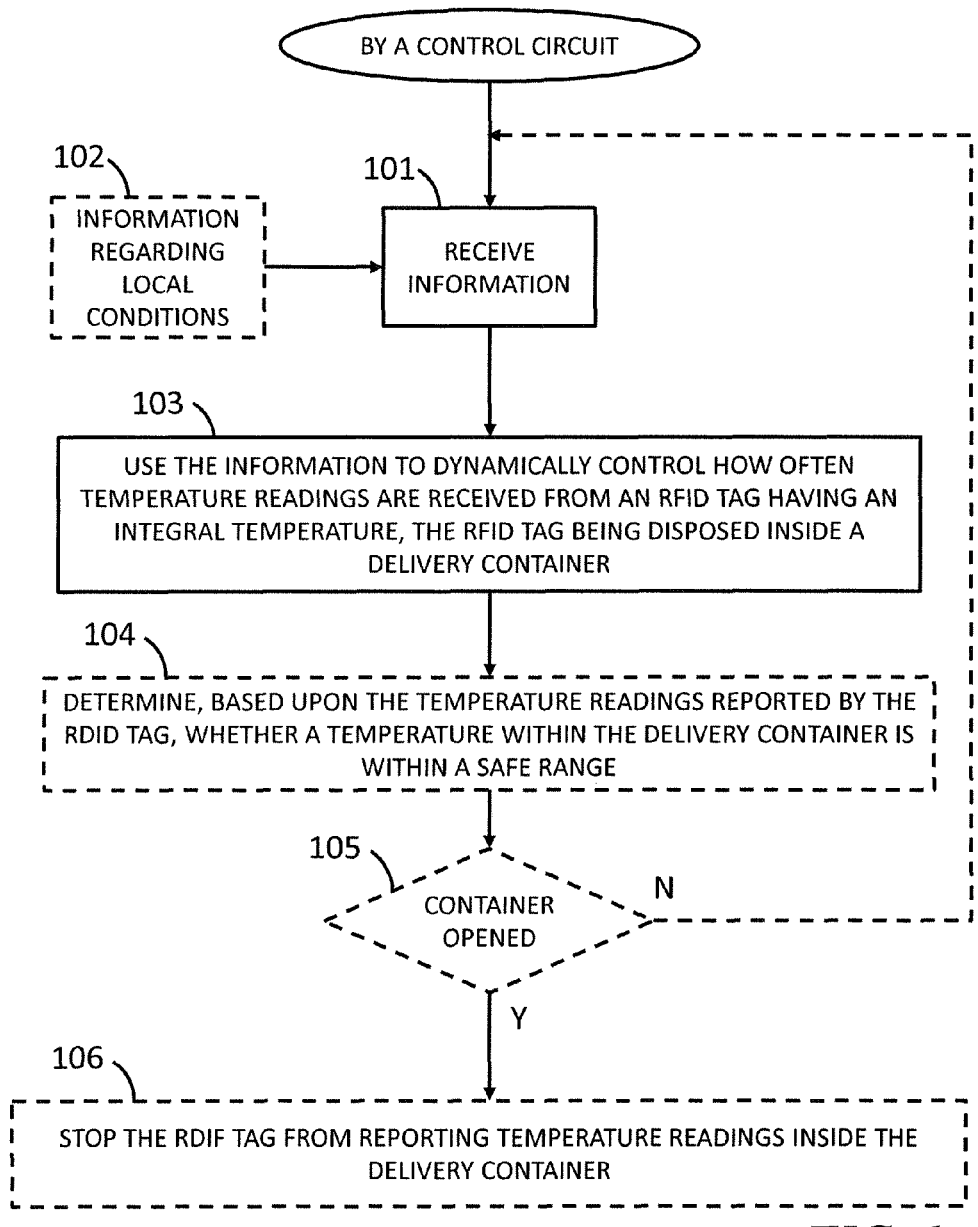
FIG. 1 comprises a flow diagram as configured in accordance with various embodiments of these teachings.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present teachings. Also, common but well-understood elements that are useful or necessary in a commercially feasible embodiment are often not depicted in order to facilitate a less obstructed view of these various embodiments of the present teachings. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to these various embodiments a control circuit is configured to dynamically control how often temperature readings are received from a communication device, such as an RFID tag, having an integral temperature sensor. The communication device can be disposed to monitor an internal temperature of, for example, a delivery container. By one approach the control circuit dynamically controls how often the temperature readings are received as a function, at least in part, of local conditions for the delivery container.

By one approach the aforementioned local conditions pertain to the contents of the delivery container. Examples in these regards include a temperature-based state of the contents, a volume-based metric of the contents, and a mass-based metric of the contents.

By another approach, in lieu of the foregoing or in combination therewith, the aforementioned local conditions can pertain to ambient conditions of the delivery container. These teachings will accommodate information regarding recent ambient conditions of the delivery container, present ambient conditions of the delivery container, and/or predicted future ambient conditions of the delivery container. The ambient conditions can include, for example, temperature, humidity, and wind speed, to note but a few examples in these regards.

So configured, the control circuit can increase a rate at which the RFID tag reports temperature readings when, for example, local temperatures are relatively high. Conversely, the control circuit can decrease the rate at which the RFID tag reports temperature readings when local temperatures are relatively low. By another approach, in lieu of the foregoing or in combination therewith, the control circuit can make dynamic adjustments in these regards as a function of a rate at which the local condition (such as a local ambient temperature) varies.

So configured, these teachings permit economical and efficient use of communication devices such as temperature-sensing RFID tags while avoiding any undue expenditure of energy corresponding to reading and reporting such information. These teachings can be successfully applied with a wide variety of temperature-sensing RFID tag technologies and RFID tag readers.

Figure 2:
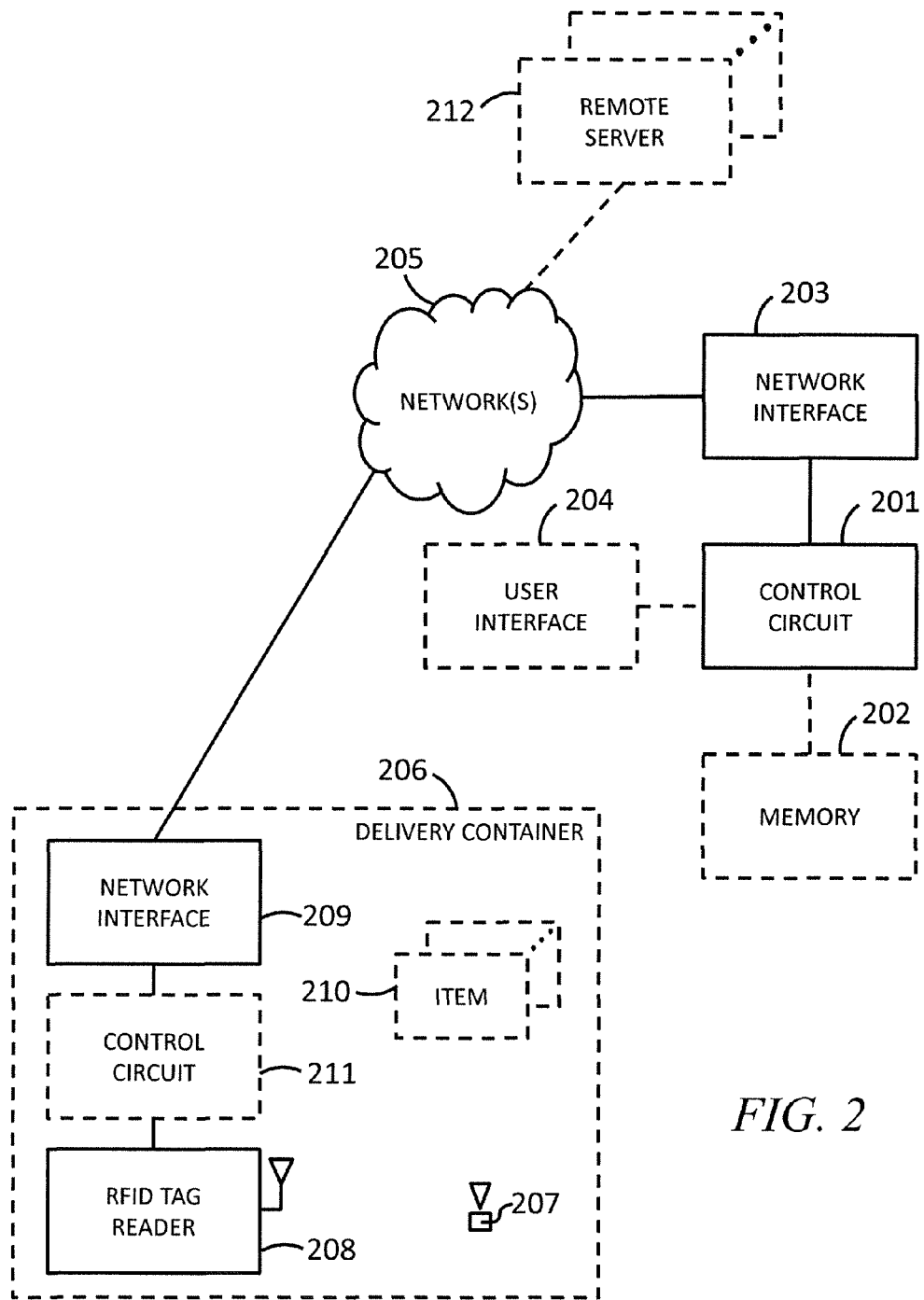
FIG. 2 comprises a block diagram as configured in accordance with various embodiments of these teachings.

These and other benefits may become clearer upon making a thorough review and study of the following detailed description. Referring now to the drawings, and in particular to FIG. 1, an illustrative process 100 that is compatible with many of these teachings will now be presented. For the sake of an illustrative example it will be presumed here that a control circuit of choice carries out this process 100. FIG. 2 provides a particular specific illustrative example. Those skilled in the art will understand that no particular limitations are intended by virtue of the specifics of this example.

In the example of FIG. 2 the control circuit 201 can comprise a fixed-purpose hard-wired platform or can comprise a partially or wholly programmable platform. These architectural options are well known and understood in the art and require no further description here. This control circuit 201 is configured (for example, by using corresponding programming as will be well understood by those skilled in the art) to carry out one or more of the steps, actions, and/or functions described herein.

In particular, per the present teachings, this control circuit 201 is configured to receive temperature readings from a communication device that has an integral temperature sensor, which temperature readings indicate temperature readings inside a delivery container. For the sake of an illustrative example this description will presume that this communication device comprises a radio-frequency identification (RFID) tag, but it will be understood that no particular limitations are intended by way of the specifics of this example. This control circuit 201 is also configured to dynamically control how often those temperature readings are received as explained below in more detail.

By one optional approach, this control circuit 201 operably couples to a memory 202 that may be integral to the control circuit 201 or that can be physically discrete (in whole or in part) from the control circuit 201 as desired. This memory 202 can also be local with respect to the control circuit 201 (where, for example, both share a common circuit board, chassis, power supply, and/or housing) or can be partially or wholly remote with respect to the control circuit 201 (where, for example, the memory 202 is physically located in another facility, metropolitan area, or even country as compared to the control circuit 201).

This memory 202 can serve, for example, to non-transitorily store the computer instructions that, when executed by the control circuit 201, cause the control circuit 201 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM) as well as volatile memory (such as an erasable programmable read-only memory (EPROM).)

The control circuit 201 operably couples to a network interface 203. This network interface 203 permits compatible communications via one or more intervening wireless or non-wireless data networks 205. Networks and network interfaces are well understood in the art. Since the present teachings are not particularly sensitive to any special selections in these regards, further elaboration is not provided here for the sake of brevity.

By another optional approach (in lieu of the foregoing or in combination therewith) the control circuit 201 operably couples to a user interface 204. This user interface 204 can comprise any of a variety of user-input mechanisms (such as, but not limited to, keyboards and keypads, cursor-control devices, touch-sensitive displays, speech-recognition interfaces, gesture-recognition interfaces, and so forth) and/or user-output mechanisms (such as, but not limited to, visual displays, audio transducers, printers, and so forth) to facilitate receiving information and/or instructions from a user and/or providing information to a user.

Also in this illustrative example, a delivery container 206 contains a temperature-reading RFID tag 207. As used herein, a temperature-reading RFID tag will be understood to refer to an RFID tag that is capable of sensing (via an integral component) a local temperature and reporting that temperature when read by an RFID tag reader. To facilitate the latter, the delivery container 206 also includes an RFID tag reader 208. So configured, the RFID tag reader 208 can read the RFID tag 207 and receive local temperature information in the transmitted response. The RFID tag reader 208 can then forward that local temperature information via an appropriate network interface 209 and the aforementioned network(s) 205 to the aforementioned control circuit 201. The control circuit 201 can utilize that local temperature information to make informed decisions regarding a likely state of one or more items 210 that are contained within the delivery container 206 and that are intended for delivery to a corresponding recipient.

The present teachings are highly flexible in practice and will accommodate a variety of modifications. As one example in these regards, the aforementioned control circuit 201 can instead be disposed within or as part of the delivery container 206 as represented by the control circuit denoted by reference numeral 211.

With continued reference to both FIGS. 1 and 2, at block 101 the control circuit 201 receives information. This information may be received from, for example, the RFID tag 207 inside the delivery container 206, from one or more other sensors as comprise a part of the delivery container 206, and/or from one or more remote servers 212 that the control circuit 201 can access via the aforementioned network(s) 205. By one approach, this information includes information 102 regarding local conditions (i.e., local conditions as pertain to the interior and/or exterior of the above mentioned delivery container 206). These teachings are highly flexible in these regards and will accommodate a wide variety of information types.

As one example in these regards, the information regarding local conditions for the delivery container 206 includes information regarding the contents 210 of the delivery container 206. Examples in these regards include but are not limited to a temperature-based state of the contents 210 (such as a temperature of the item or a more general temperature-state characterization of the item such as "frozen," "partially-frozen," and "not frozen"), a volume-based metric of the contents 210 (such as the overall three-dimensional dimensions of the item and/or a volume-based metric such as X cubic centimeters), and a mass-based metric of the contents 210 (such as X grams), to note but a few examples in these regards.

As another example in these regards, the information regarding local conditions for the delivery container 206 includes information regarding ambient conditions of the delivery container 206. As used herein, this reference to "ambient conditions" will be understood to refer to environmental conditions proximal to but external to the delivery container 206. The degree of proximity can vary with the needs of a particular application setting. By one approach this proximity can correspond to general ambient conditions within a specific geographic area (such as a square or circle that is 0.5 miles wide, 1 mile wide, 5 miles wide, or the like) or a specific municipality or county. By another approach the proximity can be immediate to the delivery container 206 and represent conditions specifically within, say, one or two meters of the delivery container 206.

Examples in these regards include but are not limited to information regarding recent ambient conditions of the delivery container 206, present ambient conditions of the delivery container, and predicted future ambient conditions of the delivery container. The ambient conditions themselves can comprise such things as air temperature, relative atmospheric humidity, air pressure, wind speed, sunny, partly sunny, or cloudy conditions, and so forth.

Such information can help inform a decision regarding how susceptible the contents of the delivery container 206 may be to warming and/or how likely the interior temperature of the delivery container 206 will rise within a particular timeframe.

Figure 3:
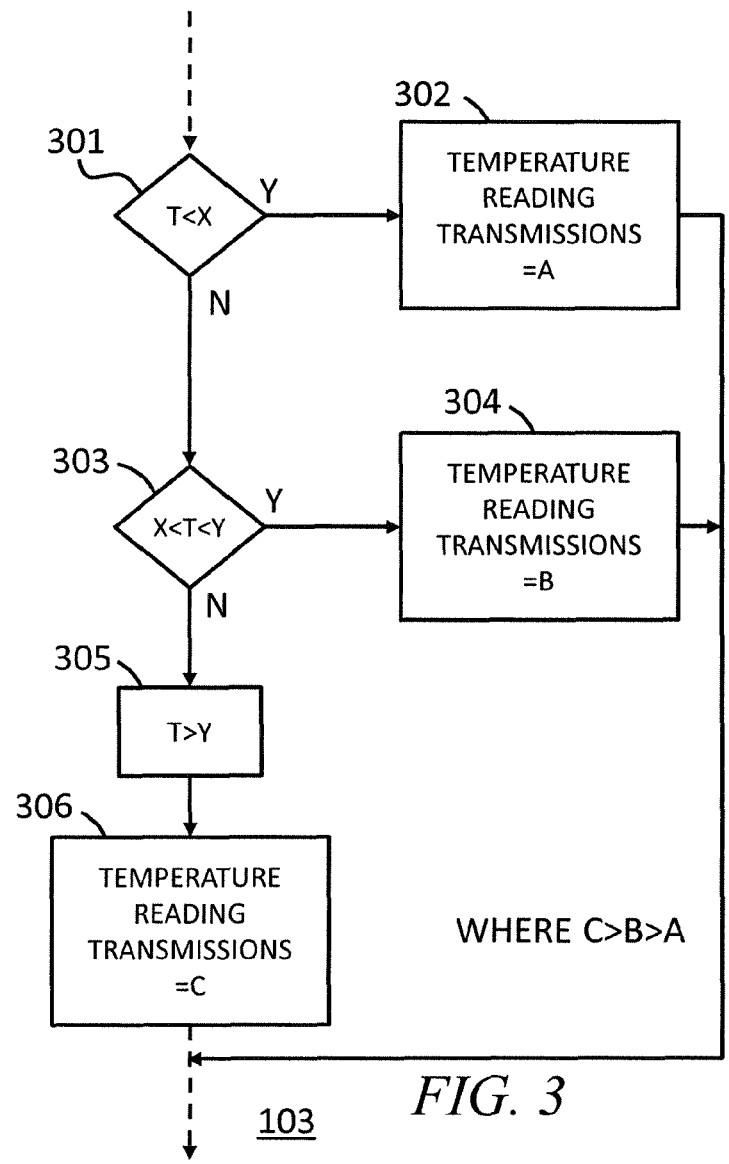
FIG. 3 comprises a flow diagram as configured in accordance with various embodiments of these teachings.

At block 103 the control circuit 201 uses the foregoing information to dynamically control how often temperature readings are received from the aforementioned RFID tag 207 that is disposed within the delivery container 206. The specifics of how the control circuit 201 dynamically controls that activity can vary with the needs and/or opportunities that tend to characterize a given application setting. FIG. 3 illustrates one illustrative example in these regards.

In this example the control circuit 201 receives local information comprising the current ambient temperature T for the delivery container 206. At decision block 301 the control circuit 201 determines whether that temperature T is less than some predetermined threshold X. That threshold X can comprise a static value (such as 50° F., 60° F., 70° F., and so forth) that the control circuit 201 always employs or can be dynamically determined as desired. The control circuit 201 might dynamically specify this threshold X as a function, for example, of the mass and/or density of the item 210 to be delivered (with a denser item being presumably less susceptible in the short term to a significant shift in internal temperature due to its own relatively higher thermal mass and hence making a higher threshold X perhaps more appropriate than for an item 210 having a relatively small mass/density).

When true, the control circuit 201 dynamically sets, at block 302, the temperature reading transmissions to a periodicity value represented here by A. For example, the control circuit 201 may specify that temperature readings are to be subsequently received from the RFID tag 207 every hour, or every 30 minutes, or every 15 minutes, or some other interval of choice.

When not true, the control circuit 201 then determines in this example whether the temperature T is greater than the aforementioned threshold X but less than a second threshold Y. This might comprise, for example, determining whether the temperature T is greater than 60° but less than 70° F. When true, the control circuit 201 dynamically sets, at block 304, the temperature reading transmissions to a periodicity value represented here by B. For example, under these circumstances the control circuit 201 may specify that temperature readings are to be subsequently received from the RFID tag 207 more frequently than when the temperature reading is less than threshold X.

When not true, the control circuit 201 determines at block 305 that the temperature T is greater than the aforementioned second threshold Y and responds by dynamically setting, at block 306, the temperature reading transmissions to a periodicity value represented here by C. Generally speaking, in this example C is greater than B which is, in turn, greater than A.

Figure 4:
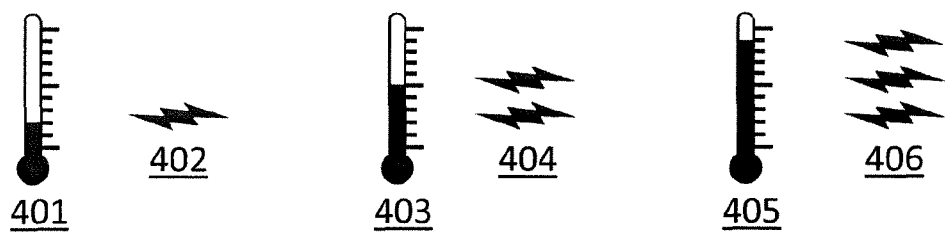
FIG. 4 comprises a graphic illustration as configured in accordance with various embodiments of these teachings.

So configured, and referring to FIG. 4, when the local ambient temperature is relatively low as denoted at reference numeral 401 the control circuit 201 dynamically controls the transmissions of temperature information such that the latter occur less frequently as represented at reference numeral 402. When the local ambient temperature is somewhat higher, as denoted at reference numeral 403, the control circuit 201 dynamically controls the transmissions of temperature information such that the latter occur more frequently as represented at reference numeral 404. Similarly, when the local ambient temperature is higher yet as represented at reference numeral 405, the control circuit 201 dynamically controls the transmissions of temperature information such that the latter occur even more frequently as represented at reference numeral 406.

So configured, the control circuit 201 configures the system at the delivery container 206 to make less frequent transmissions of temperature information as regards the interior of the delivery container 206 when conditions are such that the interior temperature is not particularly likely to detrimentally change quickly. The aforementioned system therefore reduces its energy consumption needs. When conditions are such that the interior temperature is more likely to detrimentally change in the near term, the control circuit 201 configures the system at the delivery container 206 to make more frequent transmissions of temperature information. The corresponding increase in energy usage is more appropriate in view of the increased risk to the quality of the items 210 to be delivered.

In the example above the variable of interest T represented a current ambient temperature. The same approach, however, can be employed when the variable of interest T represents instead a rate of change of the monitored temperature (including either a rate of change of an ambient external temperature and/or a rate of change of a monitored internal temperature of the delivery container 206). Similar processes can be adapted and utilized to make use of other information regarding local conditions, either in lieu of the foregoing or in combination therewith as desired.

Referring again to FIGS. 1 and 2, at optional block 104 the control circuit 201 can determine, based upon temperature readings being reported by the RFID tag 207, whether a temperature within the delivery container 206 is within a safe range. When such is not the case, the control circuit 201 can respond as desired. By one approach, for example, the control circuit 201 can sound a local or remote alarm or alert. By another approach the control circuit 201 can source the transmission of a corresponding text or email message to inform one or more authorized associates and/or the intended recipient of the items 210 to be delivered of the detected situation. These teachings will accommodate other responses as desired.

At optional block 105 the control circuit 201 can determine and detect whether and when the delivery container 206 has been opened. By one approach this can include detecting whether that opening was effected by an authorized person such as the intended recipient. For example, the authorized person may enter a code or be wearing an RFID tag that identifies themselves as being an authorized person. When true, the control circuit 201 can then, at block 106, stop the RFID tag 207 from reporting temperature readings from inside the delivery container 206 since those reports are likely no longer pertinent or relevant and since halting such reports can further serve to conserve local energy resources of the delivery container system.

These teachings permit and facilitate the efficient and economical use of one or more RFID tags that have an integral temperature-sensing component or capability. In particular, the rate at which such an RFID tag is read and/or that information transmitted externally to the delivery container can safely vary in a way that balances risk to the quality of the items being delivered with energy expenditure of the delivery container system.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:

1. An apparatus to monitor an internal temperature of a delivery container, comprising:
    a communication device having an integral temperature sensor, the communication device being disposed inside the delivery container such that the integral temperature sensor reads temperatures inside the delivery container;
    a control circuit disposed external to the delivery container and configured to:
        receive temperature readings from the communication device indicating temperature readings inside the delivery containers;
        receive information regarding ambient conditions external to the delivery container; and
        dynamically control how often the temperature readings are received as a function, at least in part, of the information regarding the ambient conditions that are external to the delivery container.

2. The apparatus of claim 1 wherein the communication device comprises a radio-frequency identification (RFID) tag.

3. The apparatus of claim 1 wherein the information regarding ambient conditions external to the delivery container include at least one of information regarding recent ambient conditions, present ambient conditions, and predicted future ambient conditions.

4. The apparatus of claim 1 wherein the information regarding ambient conditions external to the delivery container include at least one of information regarding temperature, humidity, and wind speed.

5. The apparatus of claim 1 wherein the control circuit is configured to dynamically control how often the temperature readings are received as a function, at least in part, of ambient conditions external to the delivery container such that the communication device reports the temperature readings less frequently when the ambient conditions external to the delivery container are such that a rate of change of a temperature within the delivery container is less than a predetermined amount.

6. The apparatus of claim 1 wherein the control circuit is further configured to stop the communication device-report regarding temperature readings inside the delivery container upon determining that the delivery container has been opened.

7. The apparatus of claim 1 wherein the control circuit is further configured to dynamically control how often the temperature readings are received as a further function of local conditions for the delivery container.

8. The apparatus of claim 7 wherein the local conditions for the delivery container include information regarding contents of the delivery container.

9. The apparatus of claim 8 wherein the information regarding contents of the delivery container includes, at least in part, information regarding at least one of a temperature-based state of the contents, a volume-based metric of the contents, and a mass-based metric of the contents.

10. A method to monitor an internal temperature of a delivery container having a radio-frequency identification (RFID) tag having an integral temperature sensor disposed within the delivery container, comprising:
    by a control circuit:
        receiving information regarding ambient conditions external to the delivery container;
        using the information to dynamically control how often temperature readings are received from the radio-frequency identification (RFID) tag;
        determining, based upon the temperature readings reported by the RFID tag, whether a temperature within the delivery container is within a safe range.

11. The method of claim 10 wherein the information regarding ambient conditions external to the delivery container include at least one of information regarding recent ambient conditions, present ambient conditions, and predicted future ambient conditions.

12. The method of claim 10 wherein the information regarding ambient conditions external to the delivery container include at least one of information regarding temperature, humidity, and wind speed.

13. The method of claim 10 wherein dynamically controlling how often the temperature readings are received from the RFID tag as a function, at least in part, of the information regarding ambient conditions external to the delivery container comprises dynamically controlling how often the temperature readings are received from the RFID tag as a function, at least in part, of the information regarding ambient conditions external to the delivery container such that the RFID tag reports the temperature readings less frequently when the ambient conditions external to the delivery container are such that a rate of change of a temperature within the delivery container is less than a predetermined amount.

14. The method of claim 10 further comprising:
    detecting that the delivery container has been opened;
    in response to detecting that the delivery container has been opened by an authorized person, stopping the RFID tag from reporting temperature readings inside the delivery container.

15. The method of claim 10 further comprising:
    receiving further information regarding local conditions for the delivery container;
    and wherein using the information to dynamically control how often temperature readings are received from the RFID tag further comprises also using the further information regarding local conditions for the delivery container to dynamically control how often temperature readings are received from the RFID tag.

16. The method of claim 15 wherein the local conditions for the delivery container include information regarding contents of the delivery container.

17. The method of claim 16 wherein the information regarding contents of the delivery container includes, at least in part, information regarding at least one of a temperature-based state of the contents, a volume-based metric of the contents, and a mass-based metric of the contents.

* * * * *